May 17, 1932.  O. ZANCAN  1,858,257
MOTOR CAR AXLE AND BRAKE
Filed April 24, 1930   3 Sheets-Sheet 1
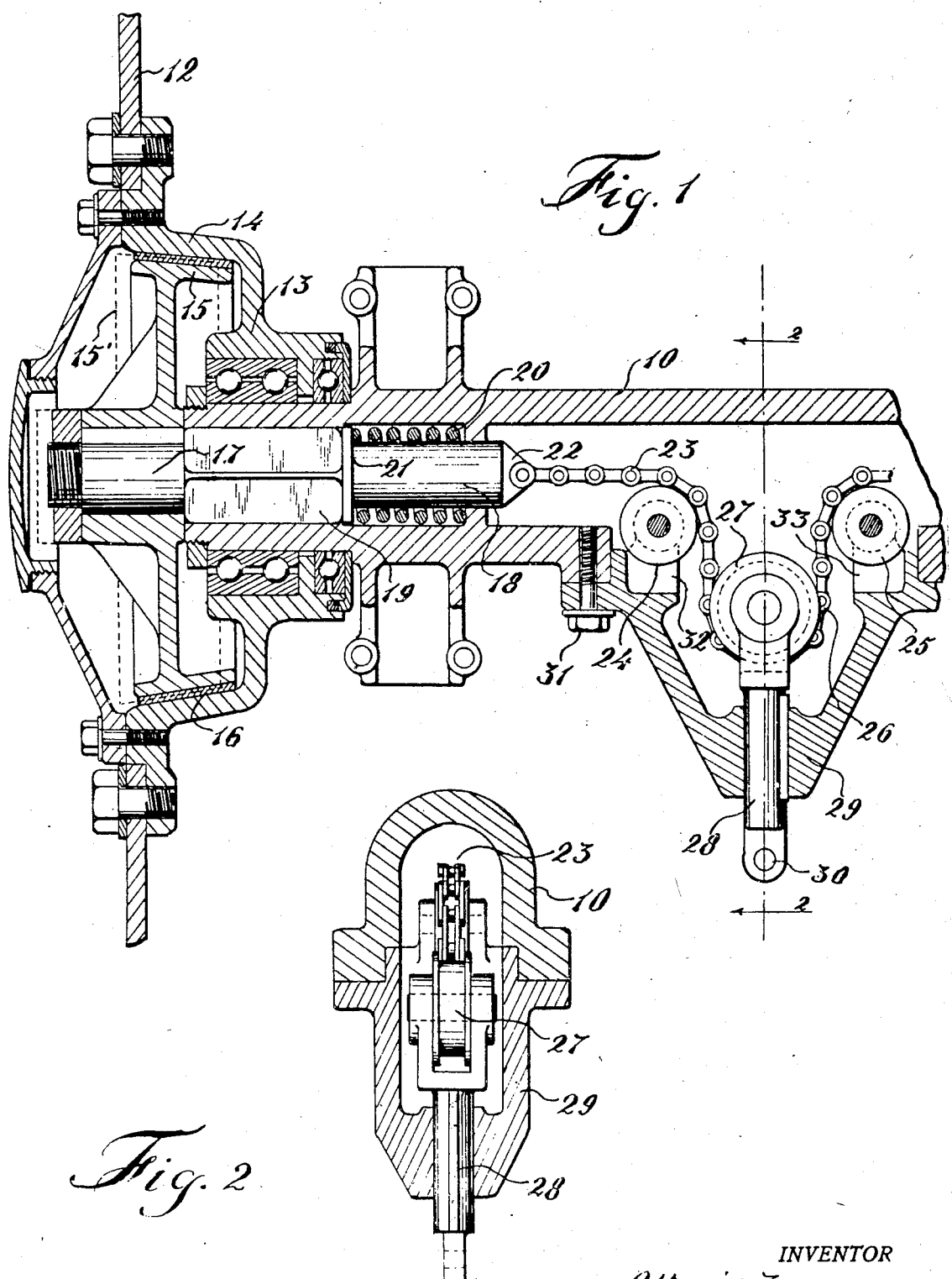
INVENTOR
Ottavio Zancan
BY
ATTORNEY May 17, 1932.  O. ZANCAN  1,858,257
MOTOR CAR AXLE AND BRAKE
Filed April 24, 1930   3 Sheets-Sheet 2
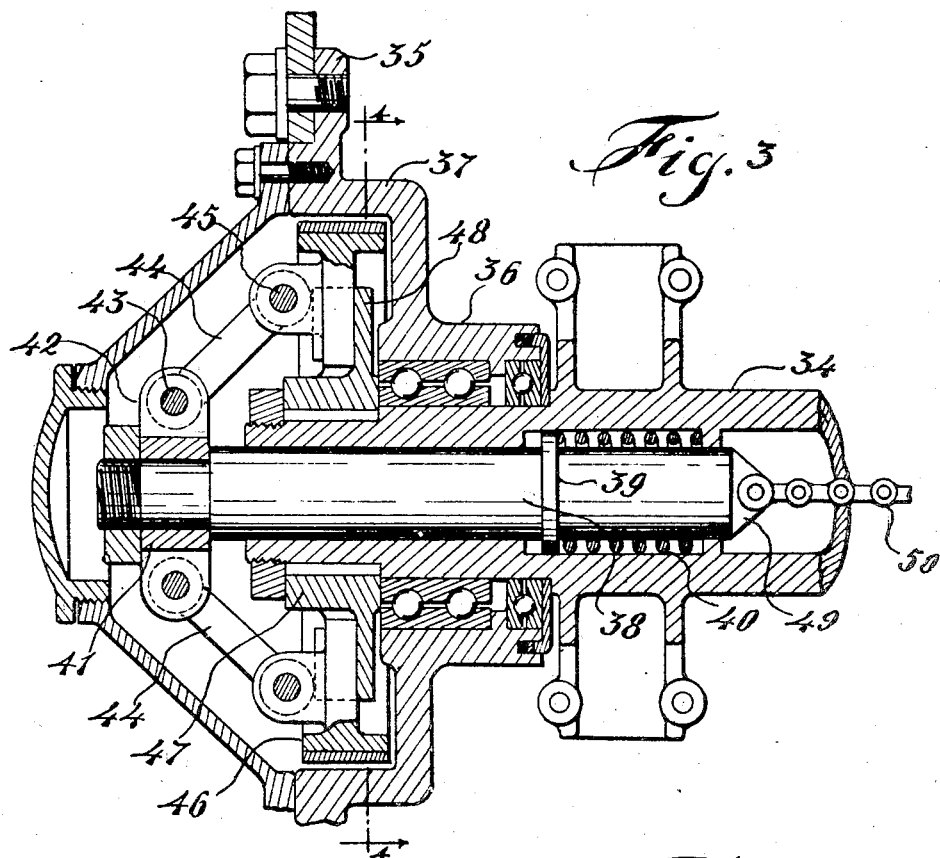
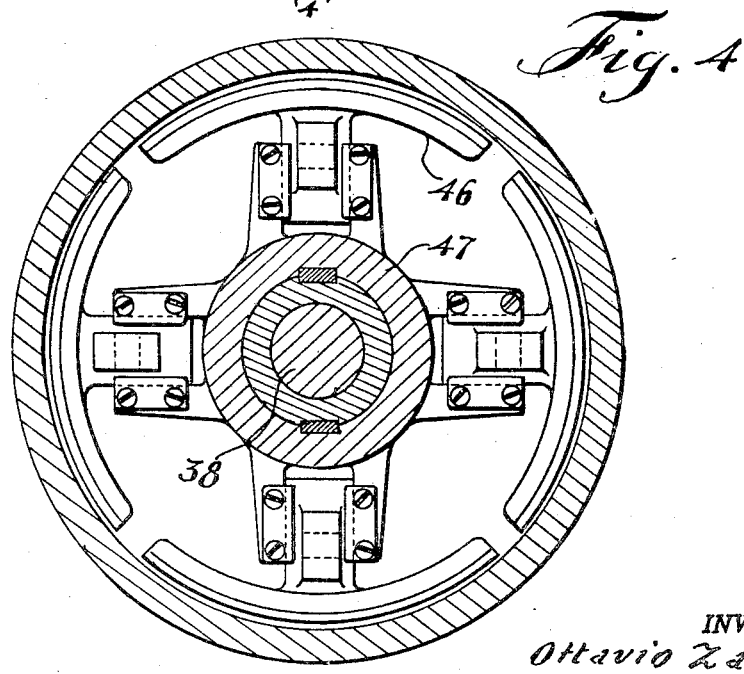
INVENTOR
Ottavio Zancan
BY
ATTORNEY May 17, 1932.  O. ZANCAN  1,858,257
MOTOR CAR AXLE AND BRAKE
Filed April 24, 1930  3 Sheets-Sheet 3
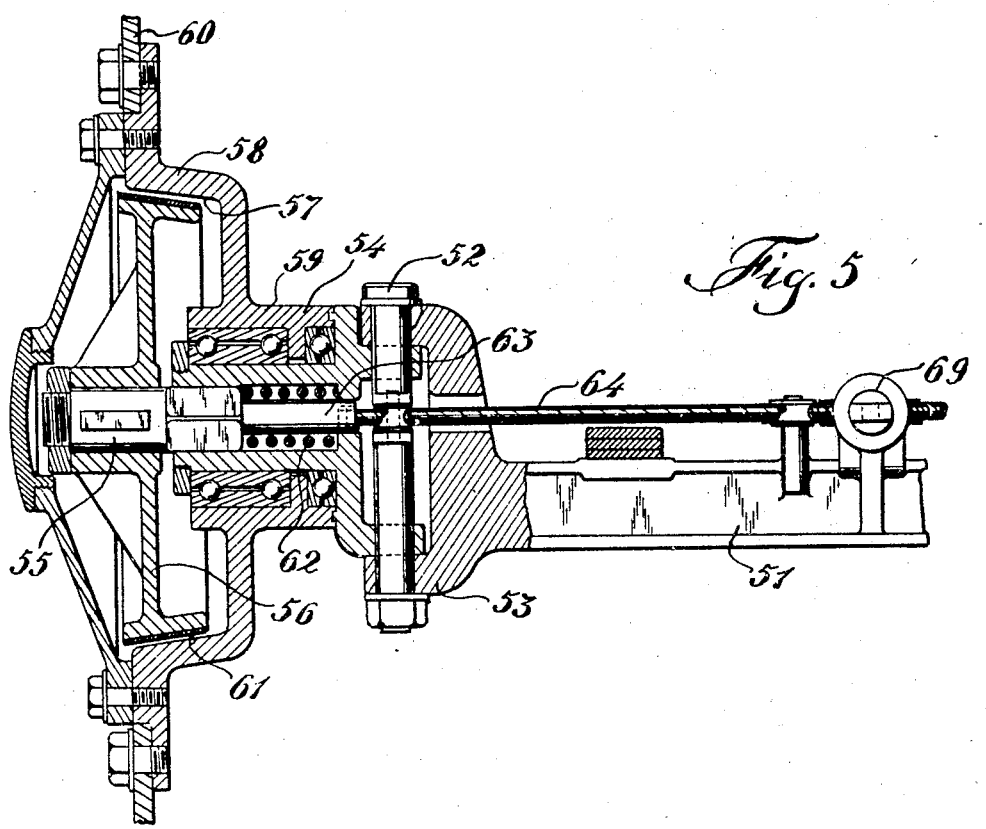
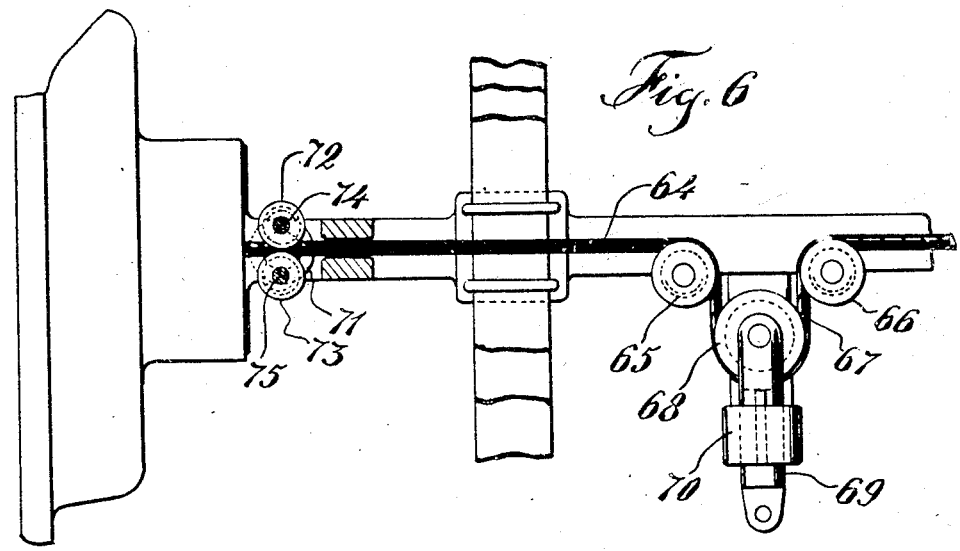
INVENTOR
Ottavio Zancan
BY
ATTORNEY Patented May 17, 1932

1,858,257

UNITED STATES PATENT OFFICE

OTTAVIO ZANCAN, OF NEW YORK, N. Y.

MOTOR CAR AXLE AND BRAKE

Application filed April 24, 1930. Serial No. 446,955.

This invention relates to motor cars and more particularly refers to improvements in motor car axle assemblies of the type where the wheels are rotatably mounted upon the axle.

Motor cars of ordinary construction are usually built for rear axle driving, and accordingly comprise two rear wheels each mounted on a shaft section inwardly extending to and actuated by the differential which is usually placed at the center of the axle housing. In certain types of motor trucks the rear wheels are rotatably mounted upon the axle, and are driven by means of chains, which are in their turn actuated by pinions carried by shafts forming part of a differential gearing.

In such cases, a solid rear axle running across the chassis of the truck from wheel to wheel is usually employed. A similar arrangement of axle has also been used in connection with motor cars of the front wheel drive type, where the power is applied to the front wheels instead of the rear wheels.

In a patent granted to me September 7, 1926, Patent No. 1,598,904 and in another application Ser. No. 367,960 copending herewith, I have described and claimed driving arrangements for motor cars of the front wheel drive type.

Insofar as I know, no attempt has heretofore been made to take advantage of the new conditions created at the rear by the adoption of such a drive, with a view to improving the braking system. Brakes of the ordinary type in which the brake applied to one wheel is to a certain extent independent of the brake applied to the other wheel have accordingly been employed, with the result that the braking action is not uniform and causes the brake bands to wear unevenly, in time impairing their efficiency.

In view of these conditions, I have found it desirable to adopt a braking system which will cause a braking action to take place simultaneously upon both wheels, and which will also be automatically balanced so as to equalize the frictional resistance applied to the two wheels.

This end can be attained by interconnecting the two braking mechanisms by means of a single actuating element, preferably of a flexible character, capable of simultaneously transmitting the braking pull to both brakes. Such an arrangement entails certain advantages in the construction of the axle itself which will be described in the course of this specification, and which also form part of the present invention.

Although the improvement forming the subject of this invention is particularly suitable for use in connection with rear axles, with minor modifications it can also be applied to advantage in connection with a front axle where the wheel carrying shafts are connected to the axle beam by means of knuckle joints, in a well known manner.

Accordingly, the primary object of this invention is to provide a novel and improved axle for motor cars in combination with means for simultaneously actuating braking devices applied to the wheels rotatably mounted thereon at each end thereof.

Another object of the invention is to provide a novel and improved arrangement of braking mechanism for motor cars whereby the frictional resistance exerted against the wheels will always be simultaneously applied and equalized between the two wheels.

A further object is to provide a rear axle and brake assembly of a novel and improved design permitting of greatly simplifying the arrangement and operation of the braking mechanism provided for the control of the wheels mounted on said axle.

Other objects and advantages of the present invention will more fully appear as the description proceeds and will be set forth and claimed in the appended claims.

My invention is illustrated by way of example in the accompanying drawings, in which:

Fig. 1 is a fragmentary plan sectional view of a rear axle embodying my invention, illustrating a brake of the conical friction disk type;

Fig. 2 is a cross section of the same through line 2—2 of Fig. 1;

Fig. 3 is a fragmentary plan section of another rear axle embodying my invention, illustrating a braking mechanism of the expanding jaws type;

Fig. 4 is a vertical section of the same through line 4—4 of Fig. 2;

Fig. 5 is a fragmentary rear wheel in elevation partly sectioned of a motor car front axle also embodying my invention; and Fig. 6 is a fragmentary plan view thereof.

Referring to Figs. 1, 2, it will be seen that instead of the solid axle usually employed in motor trucks of the chain drive type, I use a hollow axle 10 at each end of which 11 is rotatably mounted a wheel 12, the central or hub portion of which 13 is formed with a conical cup member 14 adapted to act as the female element of a cone clutch or brake.

Said cup member is adapted to be frictionally engaged by a conical friction disk member 15 provided with a packing 16, said friction disk member being carried by the outer end 17 of a bar member 18 slidably mounted within the axle.

Each bar member 18 is mounted in such a way as to prevent its rotation, for instance, by forming its intermediate portion 19 with a square section as shown, said portion registering with a square opening through the end of the axle.

Each bar member 18 is normally forced outwardly by the action of a spring 20 bearing against shoulder 21 formed between square portion 19 and round stem portion 18 so that the friction disk member 15 normally occupies the position shown in dotted lines at 15' where no braking action takes place.

It is obvious that by virtue of this arrangement, if bar member 18 is forced inwardly against the action of the spring 20, packing 16 will be gradually forced against the inner surface of cup member 14 and since bar member 18 is restrained against rotation, a braking action will be exerted against the wheel.

I accordingly operate my improved braking mechanism by connecting the inner ends 22 of the two bar members 18 by means of a flexible element 23, the length of which is greater than the distance separating said two inner ends. Said flexible element can therefore be bent about guiding rollers 24, 25 so as to form a forwardly extending loop 26 which is preferably located at the center of the axle. It is thus apparent that if a pull in a frontward direction is applied to said loop, said pull will be simultaneously transmitted to the two bar members 18 so to draw inwardly the two friction disk members 15.

It is also apparent that the force thus applied will be equalized between the two friction disks because as soon as the resistance at one end becomes greater than that at the other end, the pulling force will automatically act upon the bar member at the end where the resistance is less. In order to conveniently apply the pull upon the loop 26 I insert a roller 27 within said loop, said roller being carried by a longitudinally shiftable bar 28, carried by a bracket 29. The front end 30 of said bar 28 can be connected in any desired manner to a controlling pedal or lever (not shown) located within reach of the operator at the front, as will be understood.

For convenience of construction I prefer to make the central bracket 29 as a part separate from the axle 10, securing said bracket in position by means of screws or bolts 31. This makes it possible also to mount rollers 24, 25 upon inner projections 32, 33 of said bracket so that the entire mechanism can be readily inspected and repaired merely by removing screws or bolts 31.

While a conical friction disk type of brake may be satisfactorily applied in connection with small cars where the torque of the wheels is not excessive, in the case of large cars and trucks it is preferable to use a brake of the expansion type capable of exerting a greater force against the brake drum or cup.

As an illustration of a typical arrangement of this kind in Figs. 3, 4 I show a hollow rear axle 34, at each end of which is rotatably mounted a wheel 35, the hub portion of which 36 is formed integral with a brake drum 37.

Within each end of the axle is mounted a bar member 38 adapted to slide within said axle. Like in the previous case, each bar member 38 is formed with a shoulder 39 against which bears a spring 40 normally maintaining the bar member in its outward position shown in Fig. 3. At its outer end, each bar member carries a collar 41 provided with a plurality of radially extending ears or lugs 42 onto which are pivotally attached at 43 links such as 44, said links being pivotally attached at the other end 45 to brake shoes such as 46 carried by a flanged collar 47, radially slidable in relation to the flange 48 of said collar.

The inner ends 49 of bar members 38 are, like in the previous case, connected by a flexible element 50 which forms a forwardly extending loop (not shown) adapted to be operated in the manner previously described.

By virtue of this arrangement when bar members 38 are forced inwardly by the pull exerted by flexible element 50 in the manner previously described, links 44 will cause shoes 46 to move outwardly against the inner surface of drum 37, in a well known manner, and a positive braking action will therefore be exerted upon the wheels.

With suitable modifications, my invention may also be applied in connection with a front axle assembly in which the axles are pivotally mounted at the ends of an axle bar, or beam. An arrangement of this type is illustrated in Figs. 5, 6, in which 51 designates the axle bar or beam and 52 designates a vertical pin forming part of a knuckle joint connection between the forked end 53 of the axle bar, and a hollow axle 54.

Within said hollow axle is slidably mounted a bar member 55, which is restrained against rotation in any suitable manner, said axle carrying a conical friction brake member 56, adapted to engage conical inner surface 57 of cup 58 forming part of the hub 59 of wheel 60 rotatably mounted on said axle.

Like in the case of Figs. 1 and 2, when bar member 55 is moved inwardly, the conical surface 61 of its brake member will exert a braking action against the wheel. Bar member 55 is normally held in its outward position shown where its brake member is inoperative, by a spring 62.

The inner end 63 of bar member 55 is connected to the inner end of the bar member at the opposite side (not shown) by a flexible element 64, the intermediate portion of which also in this case is bent around guiding pulleys 65, 66 carried by the axle beam, forming a rearwardly directed loop 67 in which is inserted a pulley 68 carried by a member 69 slidable within bracket 70, said bracket being integral with or attached to the axle beam.

The operation of the braking mechanism is similar to that of the mechanisms illustrated in Figs. 1 to 4, the rearward movement of member 69 determining a pull upon both ends of the flexible element which will cause the two braking members to be forced to braking position against the action of springs 62. However, in view of the fact that the two axles 54 are pivotally mounted for steering purposes, the middle portion of pin 52 is enlarged to form two horizontal flanges such as 71, between which are mounted guiding rollers 72. 73 upon vertical pivots 74, 75. By virtue of this arrangement, the steering movements of the axles can freely take place, the same merely resulting in the flexible element being deflected one way or the other about one of the guiding rollers 72 or 73, without impairing its normal action.

It is obvious that braking devices other than those specifically shown can be employed in connection with my improved axle without departing from the inventive idea; the drawings will therefore be understood as being intended for illustrative purposes only and not in a limiting sense. Accordingly, I reserve the right to carry my invention into practice in all those ways and manners which may enter, fairly, into the scope of the appended claims.

I claim:

1. In a motor car, an axle comprising two hollow wheel supports one at each side thereof, wheels rotatably mounted on said supports, braking means for said wheels comprising a member axially movable within and extending beyond each support with respect to the wheel mounted thereon, a flexible element connecting said two members, and means to actuate said flexible element and cause inward movement of said two members.

2. In a motor car, an axle comprising two hollow wheel supports one at each side thereof, wheels rotatably mounted on said supports, braking means for said wheels comprising a member axially movable within and extending beyond each support with respect to the wheel mounted thereon, a flexible element connecting said two members, said flexible element forming a loop extending at right angles to said axle, guiding means for said element at the base of said loop, and means for exerting a pull upon said loop in a direction at right angles to said axle.

3. In a motor car, an axle comprising two hollow wheel supports one at each side thereof, wheels rotatably mounted on said supports, braking means for said wheels comprising a member axially movable within and extending beyond each support with respect to the wheel mounted thereon, a flexible element connecting said two members, said flexible element forming a loop extending at right angles to said axle, guiding means for said element at the base of said loop, means for exerting a pull upon said loop in a direction at right angles to said axle, and yielding means within said axle normally retaining said members in their inoperative position.

4. In a motor car rear axle assembly the combination, with a hollow axle and two wheels rotatably mounted one at each end thereof, of braking means for said wheels comprising a member axially movable within and extending beyond said axle with respect to each wheel, flexible means for simultaneously actuating said members, and yielding means within said axle normally retaining said members in their inoperative position.

5. A motor car rear axle assembly comprising a hollow axle, two wheels rotatably mounted one at each end thereof, braking means for said wheels comprising a member axially movable within and extending beyond said axle with respect to each wheel, a flexible element housed within said axle connecting said two members, said flexible element forming a loop extending frontwardly of said axle, guiding rollers for said element at the base of said loop, a roller inserted within said loop, and a frontwardly movable controlling member carrying said roller.

6. A motor car rear axle assembly comprising a hollow axle and two wheels rotatably mounted one at each end thereof, braking means for said wheels comprising a member axially movable within and extending beyond said axle with respect to each wheel, a flexible element housed within said axle connecting said two members, said flexible element forming a loop extending frontwardly of said axle, guiding rollers for said element at the base of said loop, a roller inserted within said loop, a frontwardly movable controlling member carrying said roller, and a guiding support for said frontwardly movable member, detachably mounted on said axle, said guiding support carrying said guiding rollers.

7. A motor car rear axle assembly comprising a hollow axle, two wheels rotatably mounted one at each end thereof, braking means for said wheels comprising a member axially movable within and extending beyond said axle with respect to each wheel, a flexible element housed within said axle connecting said two members, said flexible element forming a loop extending frontwardly of said axle, guiding means for said element at the base of said loop, a frontwardly movable controlling member through which said loop is slidably inserted, and springs within said axle normally retaining said members in their inoperative position.

8. A motor car rear axle assembly comprising a hollow axle, two wheels rotatably mounted one at each end thereof, braking means for said wheels comprising a member axially movable within and extending beyond said axle with respect to each wheel, a flexible element housed within said axle connecting said two members, said flexible element forming a loop extending frontwardly of said axle, guiding rollers for said element at the base of said loop, a roller inserted within said loop, a frontwardly movable controlling member carrying said roller, a guiding support for said frontwardly movable member, detachably mounted on said axle, said guiding support carrying said guiding rollers, and springs within said axle normally retaining said members in their inoperative position.

OTTAVIO ZANCAN.